UNITED STATES PATENT OFFICE.

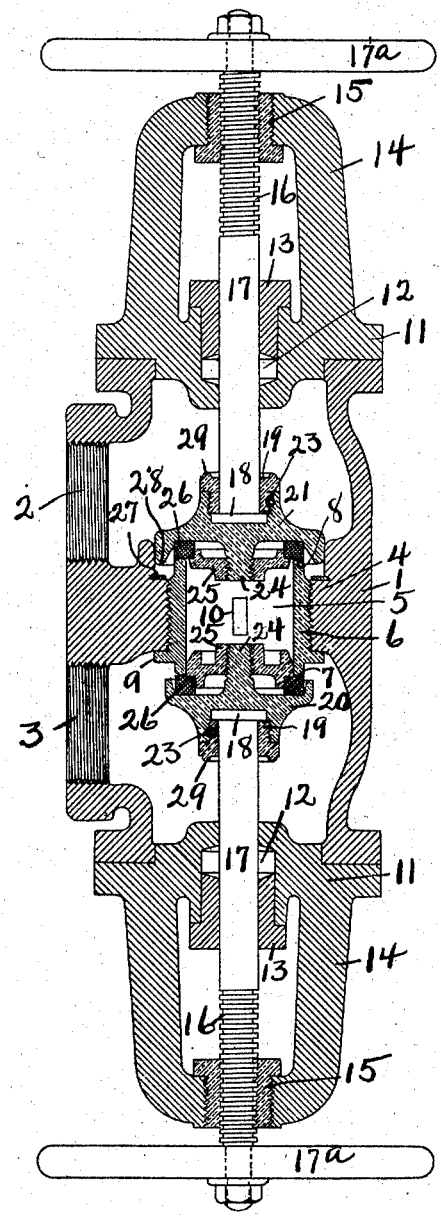

RUDOLPH CONRADER, OF ERIE, PENNSYLVANIA.

VALVE.

966,797.  Specification of Letters Patent.  Patented Aug. 9, 1910.

Application filed July 29, 1907. Serial No. 385,957.

*To all whom it may concern:*

Be it known that I, RUDOLPH CONRADER, a citizen of the United States, residing at Erie, in the county of Erie and State of Pennsylvania, have invented new and useful Improvements in Valves, of which the following is a specification.

This invention relates to valves and consists of certain improvements in the construction thereof as will be hereinafter fully described and pointed out in the claims.

The valve may be termed a throttle valve, giving to the term "throttle" its broader meaning and may be used as a throttle valve giving to it its most limited meaning.

The invention is illustrated in the accompanying drawing which is a longitudinal section through the center valve as follows: 1 marks the body of the valve, 2 the inlet passage, 3 the outlet passage.

A diaphragm 4 is arranged in the body of the valve and the valve passage 5 extends through this diaphragm. The diaphragm in the passage 5 is screw threaded and the sleeve 6 is screwed into this passage, the end near the inlet forming a seat 7, and the end near the outlet forming a seat 8. The sleeve has a flange 9 which may be brought into contact with the diaphragm so that the sleeve may be set down against the diaphragm and thus lock it in place. The sleeve also is provided with the lugs 10, which may be engaged to turn out or loosen the sleeve.

The bonnets 11 are secured to the ends of the body. These are provided with the glands 12, in which packing may be placed, each gland having the follower 13. The yokes 14 extend from the bonnets a sufficient distance to permit of the removal of the followers 13 within the yoke, and nuts 15 are secured to the outer ends of the yokes and the screws 16 of the valve stems 17 extend through these nuts and handles 17ᵃ are provided by means of which the stems may be operated.

The stems 17 have the flanged ends 18 and these are secured by the nuts 19 in the disks 20 and 21. The nuts are locked in place by cotter pins 23 which extend through the nuts and disks outside of the stems 17. The disks 20 and 21 have the screw threaded projections 24. The plates 25 are screwed on to these projections and engage and hold in place the disk seat 26 which may be formed of any desirable material suitable for this purpose.

The auxiliary seat 27 is arranged on the inlet side of the diaphragm; the valve disk 21 is provided with auxiliary seat 28 which is of a diameter to operate upon the seat 27.

It will be noted that a complete closure may be effected by either disk; further a closure may be effected at either side of the valve. By closing the valve disk 21 the bonnet 11 at the outlet side of the valve may be removed and the valve disk 20 repaired or provided with a new seat as desired. The bonnet 11 with the disk 20 removed, the sleeve 6 may be unscrewed and stem 17 and disk 21 made to follow the seat by the operation of the stem on said disk until the disk 21 seats on the auxiliary seat 27. The sleeve may then be completely removed, even though there may be pressure on the inlet side of the valve and repaired. The plate 25 on the disk 21 may then be removed and the valve seat 26 renewed or repaired as desired. The parts may then be re-assembled with pressure still on the inlet side of the valve.

In order that the glands 12 may be repacked with pressure on the valve, I provide the auxiliary seats 29 on the nuts 19; these seats are adapted to seat on the under side of the bonnets when the stems are screwed out sufficiently to bring the seats in contact with the bonnets. The yoke is of sufficient length to permit of the removal of the follower 13 without disturbing the bonnet and with the screw exerted pressure on the seat 29. The glands 12 in this position may be readily repacked or refilled and the followers replaced.

It will be noted also that the gland at the inlet side of the valve may be closed by the auxiliary seat at the inlet side and the valve as a whole closed at the passage by the disk at the outlet side so that the valve as a whole may be closed and the gland at the inlet side repacked. This, of course, may be also accomplished with regard to the gland at the outlet side by closing the valve at the inlet side.

What I claim as new is:

1. In a valve the combination of a body having an inlet and outlet passage and a diaphragm; valve disks at opposite sides of the diaphragm; means for operating the disks; and a seat for the disks nearer the outlet of the valve removable during the closure of the disk nearer the inlet of the valve.

2. In a valve the combination of a body having an inlet and outlet passage and a diaphragm; valve disks at opposite sides of the diaphragm, said disks having axial alinement; means for operating the disks; and a seat for the disk nearer the outlet of the valve removable during the closure of the disk near the inlet of the valve.

3. In a valve the combination of a body having an inlet and outlet passage and a diaphragm; valve disks at opposite sides of the diaphragm; and a sleeve in the diaphragm having seats at the ends thereof, one for each disk.

4. In a valve the combination of a body having an inlet and outlet passage and a diaphragm; valve disks at opposite sides of the diaphragm; and a sleeve in the diaphragm having seats at the ends thereof, one for each disk, said sleeve being removable.

5. In a valve the combination of a body having an inlet and outlet passage and a diaphragm; valve disks at opposite sides of the diaphragm; and a sleeve in the diaphragm; having seats at the ends thereof, one for each disk, said sleeve being removable during the closure of the disk nearer the inlet.

6. In a valve the combination of a body having inlet and outlet passages 2 and 3 respectively and the diaphragm 4, with a passage 5 therein, the diaphragm being screw threaded along the passage; a screw threaded sleeve screwed into the diaphragm, said sleeve having the seats 7 and 8 at the ends thereof; disks 20 and 21 adapted to seat on the seats 7 and 8; and means for operating the disks.

7. In a valve the combination of a body having the inlet and outlet passages and a diaphragm; valve disks at opposite sides of the diaphragm; means for operating the disks; and a disk seat on the disk nearer the inlet removable during the closure of said disk nearer the inlet.

8. In a valve the combination of a body having the inlet and outlet passages and a diaphragm; valve disks at opposite sides of the diaphragm; means for operating the disks; and a disk seat on the disk nearer the inlet removable during the closure of said disk nearer the inlet; an auxiliary seat on the diaphragm on which the disk nearer the inlet operates; and a removable seat on the diaphragm for said disk nearer the inlet.

9. In a valve the combination of a body having an inlet and outlet passage and a diaphragm therein; the disks 20 and 21 at the outlet and inlet sides of the valve respectively; and a diaphragm; a removable seat secured to the diaphragm for the disk 21 removable during the closure of said disk; and a disk seat on the disk 21 removable during the closure of said disk 21.

10. In a valve the combination of a body having an inlet and outlet passage and a diaphragm; disks at the opposite sides of the diaphragm; means for operating the disks and a seat for the disk nearer the inlet removable during the closure of the disks nearer the inlet.

11. In a valve the combination of a body having an inlet and outlet passage and a diaphragm; disks at the opposite sides of the diaphragm; means for operating the disks; a main seat for the disk nearer the inlet removable during the closure of said disk nearer the inlet; an auxiliary seat on which the disk nearer the inlet seats upon the removal of the main seat.

12. A throttle valve formed with a steam passage and provided with two valve disks mounted on the respective stems and movable independently thereby in opposite directions to close the passage.

13. A throttle valve formed with a circular passage and provided with valve disks swiveled on respective stems in registration with the passage and with each other and on opposite sides of the passage, said disks being movable independently with the respective stems in opposite directions to close the passage.

14. In a throttle valve, a body formed with a partition having a circular passage therethrough, valve stems adjustably supported on opposite sides of the partition in the axial line of the passage, and valve disks swiveled on the respective stems and independently movable thereby in opposite directions to close the passage.

15. In a throttle valve, the combination with a body, a partition having a circular passage, a stem adjustable toward one side of the partition and a valve disk thereon in registration with the passage, of an additional stem independently adjustable toward the opposite side of the partition, and a valve disk thereon in registration with the passage.

In testimony whereof I have hereunto set my hand in the presence of two subscribing witnesses.

RUDOLPH CONRADER.

Witnesses:
C. D. HIGBY,
E. B. EAGLES.